United States Patent
Hartmann

[11] 4,223,186
[45] Sep. 16, 1980

[54] CIRCUIT ARRANGEMENT FOR LINE-SUPPLIED SUBSCRIBER STATIONS HAVING DIAL DEVICES

[75] Inventor: Karl D. Hartmann, Munich, Fed. Rep. of Germany

[73] Assignee: Siemens Aktiengesellschaft, Berlin & Munich, Fed. Rep. of Germany

[21] Appl. No.: 27,023

[22] Filed: Apr. 4, 1979

[30] Foreign Application Priority Data

Apr. 14, 1978 [DE] Fed. Rep. of Germany ....... 2816311
Apr. 14, 1978 [DE] Fed. Rep. of Germany ....... 2816347

[51] Int. Cl.² ................ H04M 19/00; H04M 1/31
[52] U.S. Cl. ...................... 179/90 K; 179/81 R
[58] Field of Search ........... 179/90 R, 90 K, 16 EC, 179/81 R, 90 D

[56] References Cited

U.S. PATENT DOCUMENTS

| | | | |
|---|---|---|---|
| 3,969,592 | 7/1976 | Pipitone et al. | 179/90 R |
| 3,973,084 | 8/1976 | Hovland | 179/90 K |
| 4,046,971 | 9/1977 | Losehand | 179/90 K |
| 4,081,619 | 3/1978 | Losehand | 179/90 K |
| 4,167,655 | 9/1979 | Hestad et al. | 179/90 K |

FOREIGN PATENT DOCUMENTS

| | | | |
|---|---|---|---|
| 2216099 | 10/1973 | Fed. Rep. of Germany | 179/90 K |
| 2341221 | 2/1975 | Fed. Rep. of Germany | 179/90 K |
| 2615337 | 10/1977 | Fed. Rep. of Germany | 179/90 K |

Primary Examiner—Gerald Brigance
Attorney, Agent, or Firm—Hill, Van Santen, Steadman, Chiara & Simpson

[57] ABSTRACT

A circuit arrangement for subscriber stations which are supplied by way of subscriber lines and which have dial devices and voice circuits employ, in order to minimize the insertion lost during the voice mode, current feed to the dial device by way of a double Graetz bridge in which two bridge arms are provided in common for both bridges. An additional resistor is connected in the feed line of one of the two bridges os that, in a voice mode, the bridge with the additional resistor is actively switched by means of a dial off-normal contact, whereas, in the dialing mode, the bridge without the additional resistor is actively switched.

7 Claims, 2 Drawing Figures

CIRCUIT ARRANGEMENT FOR LINE-SUPPLIED SUBSCRIBER STATIONS HAVING DIAL DEVICES

BACKGROUND OF THE INVENTION

1. Field of the Invention

The present invention relates to a circuit arrangement for subscriber stations, in particular telephone subscriber stations, which are supplied by way of subscriber lines, the stations having dial devices and being employed in a dialing mode and a voice mode, and more particularly to such a circuit arrangement in which the dial device has only three connection points for the generation of dial switch pulses which are fed by way of rectifier bridge.

2. Description of the Prior Art

In modern subscriber stations, such as for example, in the so-called pseudotouch dialing, there is a desire to insert not only simple electronic pulse generating circuits as dialing devices in the subscriber line via a three-terminal plug-in connection, but also to insert dialing devices with the possibility of abbreviated dialing and dial repetition. In doing so, however, a problem arises in that, in contrast to electronic pulse generator circuits, abbreviated dialing devices, for example, require a supply current not only in the dialing mode, but also in the voice mode of the subscriber station since, otherwise, no signals at the beginning and at the end of a call number is possible without extensive measures. At the same time, however, the insertion loss required, for example by the postal administration in Germany, which is produced by connections in parallel to the speech connection, may not be exceeded in the voice mode.

SUMMARY OF THE INVENTION

The object of the present invention, therefore, is to provide a circuit arrangement of the type generally mentioned above in such a manner that the dialing devices also contain abbreviated dialing devices or, respectively, dial repetition devices, and that the insertion loss during the voice mode is so low that the allowable values are not exceeded.

The above object is achieved, according to the present invention, in a circuit arrangement of the type generally mentioned above in that the current feed of the dialing device occurs over a double Graetz bridge in which two bridge arms are provided in common for both bridges, and in which an additional resistor is inserted in the feed line of one of the two bridges, whereby the bridge with the additional resistor is switched to an active state in a voice mode by means of a dial off-normal contact, whereas the bridge without the additional resistor is activated in the dialing mode.

In a circuit arrangement constructed in accordance with the present invention, a distinction is made between the dialing mode and the voice mode so that the bridge circuit can be switched to greater resistance in the voice mode than in the dialing mode with the assistance of the additional resistor. By doing so, an advantage is gained that the connection of dialing devices having possibilities for abbreviated dialing or dial repetition is possible without intervention in the subscriber stations and, at the same time, the aforementioned insertion loss requirement is met, as well as a requirement that the circuit be independent of the polarity.

In another embodiment, a circuit arrangement constructed in accordance with the present invention is provided in which the pulse contact controllable by means of an electronic pulse generator circuit is formed by means of a transistor, and the circuit arrangement is characterized in that, during the voice mode, the transistor is bridged and its base circuit is interrupted. The advantage gained by this embodiment of the invention is that, during the voice mode, the insertion loss can be maintained within the prescribed values by means of the disconnection of the transistor, since the supply current for the dialing device need not flow by way of the transistor and the base current required for that purpose no longer exists as a consumer in addition to the extant dialing installation.

In a further development of the invention, according to the second embodiment, the transistor is bridged with a free contact present in the dialing device, which contact is closed in the voice mode. It is thereby achieved, in a simple manner, that the current required by the dialing device during the voice mode flows via the free contact which is closed in the voice mode, whereas the contact is opened in the dialing mode and, thereby, the transistor lies in the supply current path so that the dial switch pulses can be transmitted in a known form.

According to a further development of the invention, the circuit arrangement is characterized in that the base circuit of the transistor is controlled via C-MOS circuits of a logic circuit. It is possible to maintain the insertion loss very low by employing C-MOS circuits in the control circuit for the transistor.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
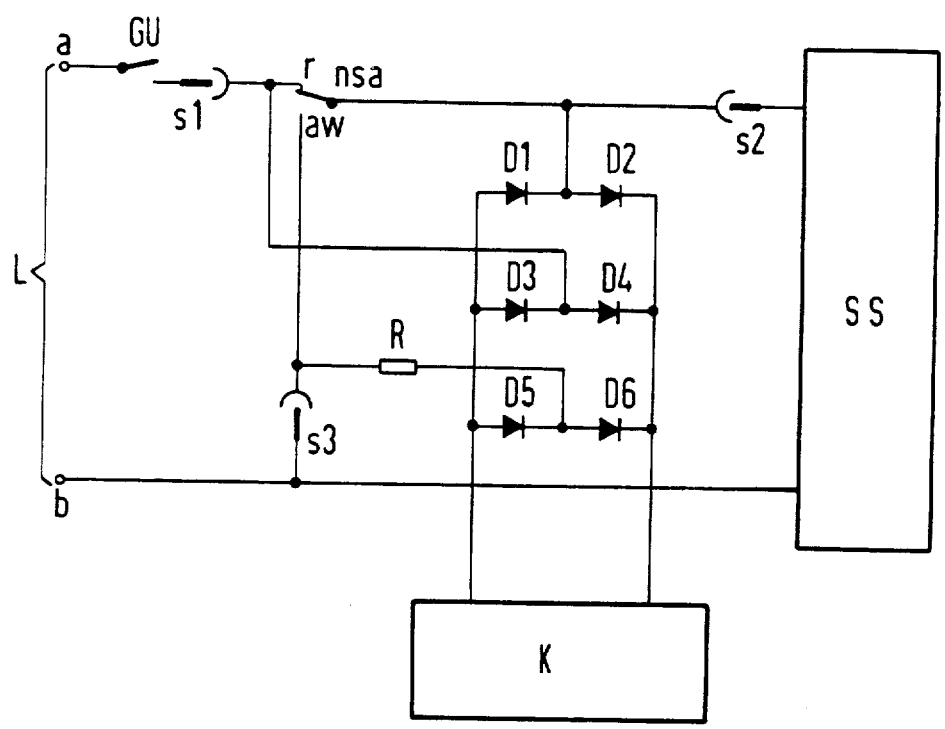
FIG. 1 is a schematic circuit diagram of a subscriber substation in which the current feed of the dialing device occurs via a double Graetz bridge.

FIG. 1 illustrates a voice circuit SS which is connectible to the two lead a and b of a subscriber line L. In addition, a dialing device K is illustrated as having a three-terminal plug connection with the connection points s1–s3.

The illustrated circuit arrangement is shown in its idle condition, i.e. the hand set is on-hook, which is indicated by means of the open hookswitch GU.

In the voice mode, current flows from the lead a, via the closed hook switch GU, the connection point s1, the dial off-normal contact located in its idle position r and via the connection point s2 into the voice circuit SS and then back to the central exchange by way of the lead b. Thereby, a voltage of a predetermined polarity arises between the connection points s2 and s3, which voltage can be tapped, at the correct polarity, by way of the resistor R and the diodes D5 or D6 and D1 or D2. The dimensioning of the resistor R depends on the power consumption of the abbreviated dialing installation and the allowed insertion loss. A choke can also be inserted in the feed line instead of an ohmic resistance.

In the dialing mode, the current flows, for example, from the lead a via the closed hookswitch GU, the connection point s1 and the diodes D3 or D4 into the dialing device K. From the dialing device, the current flows by way of the diode D1 or D2 to the dial off-normal contact which is in its working position aw because of the dialing mode and then flows by way of the connection point s3 and the lead b back to the switching center. The voice circuit SS as well as the resistor R are short-circuited and separated from the lead a so that the dialing device K can transmit the necessary dialing pulses.

Figure 2:
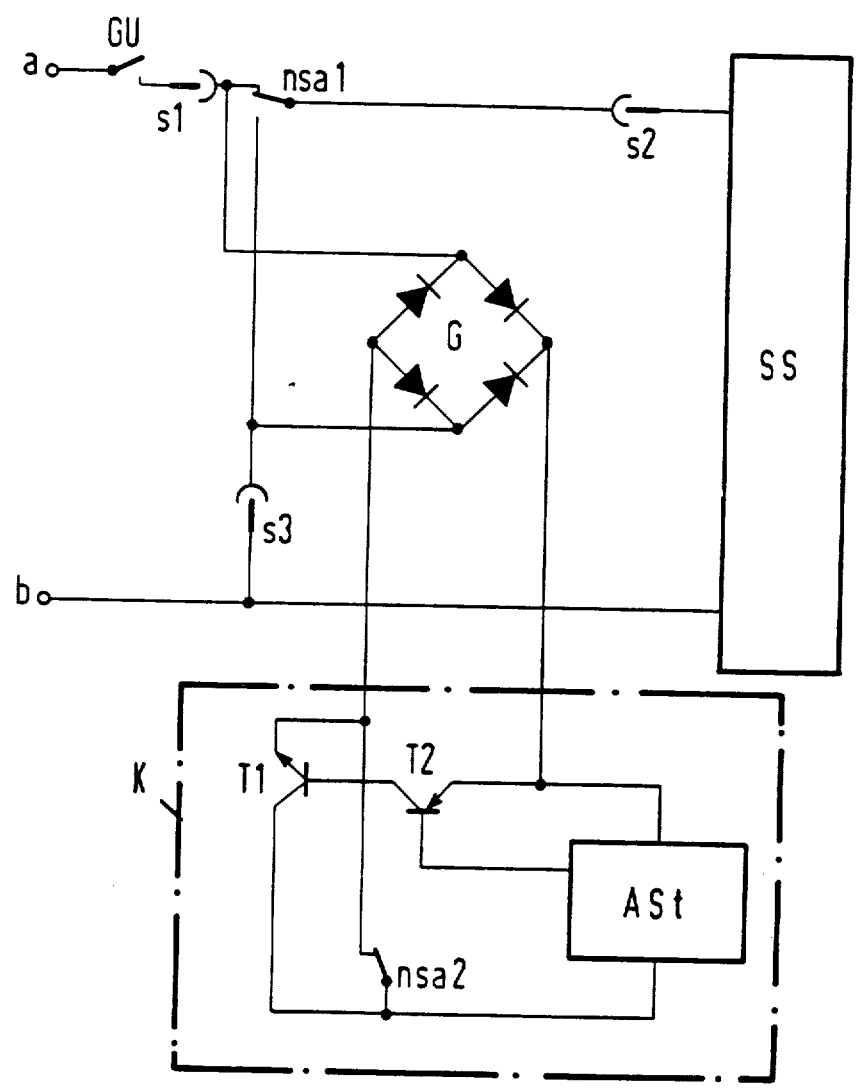
FIG. 2 is a schematic circuit diagram of a subscriber station in which a transistor of a dialing device serving as a pulse contact is bridged during the voice mode of operation.

FIG. 2 illustrates a voice circuit SS connected to the two leads a and b, and the three connection points s1–s3 for the connection of a dialing device K which is to be equipped with the possibility for abbreviated dialing and dial repetition in the exemplary embodiment illustrated. FIG. 2 further illustrates a standard rectifier bridge G, a contact nsa1 of a NSA relay, as well as the dialing device K having two transistors T1 and T2, a contact nsa2 and the appertaining remaining control circuit ASt.

The feed of the dialing device K by way of the three-terminal connection is readily apparent from FIG. 2. When the handset is lifted, the connection points s1 and s2 are connected by way of the subscriber line with the switching device over the lead a, since the hook switch GU is closed. The voice circuit SS is connected at the connection point s2 and s3.

In the voice mode, the connection points s1 and s2 are connected with one another by way of the contact nsa1 which is in its idle position. A current is branched-off parallel to the voice circuit SS at the connection points s1 and s3 by way of the rectifier bridge G, which current supplies the dialing device K by way of the closed contact nsa2. Thereby, the transistor T2 is blocked via a logic circuit present in the dialing device K, so that the transistor T1, which functions as a controllable pulse contact for the pulse generation, does not receive base current. Therefore, this load which exists in addition to the remaining dialing device K is switched off.

During the dialing mode, the connection points s2 and s3 are connected with one another via the contact nsa1 which is then in its working position (opposite that illustrated). Thereby, the connection between the connection points s1 and s2 is opened, so that the voice circuit SS is short-circuited. The full loop current flows to the dialing device K via the rectifier bridge G. The contact nsa2 is conductively switched by the logic circuit present in the dialing device K so that the transistor T1 receives base current and the loop current can flow via the transistor T1. With the assistance of the transistor T1, the loop current can then be briefly interrupted corresponding to the dial switch pulses.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A circuit arrangement for a subscriber station which is supplied with a current via a two-wire subscriber line and which includes a hookswitch serially connected to one of the line wires, a voice circuit having two leads and a dialing device having two leads, comprising:

a rectifier bridge circuit including a first bridge section comprising first and second bridge arms connected together at a first junction, a second bridge section comprising third and fourth bridge arms connected together at a second junction, and a third bridge section comprising fifth and sixth bridge arms connected together at a third junction, said first and second bridge arms together connected in parallel across said third and fourth bridge arms, across said fifth and sixth bridge arms, and across the leads of the dialing device;

an impedance;

dial off-normal contacts including first, second and third contacts, said first contact connected to said first junction and in the voice mode normally contacting said second contact and operable during dialing to contact said third contact;

first, second and third connection terminals, said first connection terminal connected to said second contact and to said second junction and adapted for connection to the hookswitch, said second connection terminal connected to said first junction with said first contact and adapted for connection to one lead of the voice circuit, and said third terminal connected to said third junction via said impedance and adapted for connection to the other line wire and the other voice circuit lead, whereby in the voice mode said first and third bridge sections are rendered active and in the dialing mode said first and second bridge sections are rendered active.

2. The circuit arrangement of claim 1, wherein said impedance comprises an ohmic resistor.

3. The circuit arrangement of claim 1, wherein said impedance comprises an inductor.

4. The circuit arrangement of claim 1, wherein each bridge arm includes a diode which is poled opposite the like diode of the other bridge arm of the same section, with respect to the respective junction to render the arrangement operable at either polarity.

5. A circuit arrangement for a subscriber station which is supplied with current via a two-wire subscriber line and which includes a hookswitch serially connected to one of the line wires, a voice circuit with two leads and a dialing circuit with two leads, comprising:

a rectifier bridge including first, second, third and fourth junctions, said first and second junctions connected to respective dialing circuit leads;

a plurality of dial contacts including first, second and third contacts, said first contact normally engaging said second contact and operable during a dialing mode to disengage said second contact and engage said third contact; and first, second and third connection terminals, said first connection terminal adapted for connection to the hookswitch and connected to said third junction of said bridge and to said second dial contact, said second connection terminal connected to said first dial contact and adapted for connection to one lead of the voice circuit, and said third connection terminal connected to said third dial contact and to said fourth junction of said bridge and adapted for connection to the other line wire and the other lead of the voice circuit;

and wherein said dialing circuit comprises a pulse generator, a transistor including a base connected to receive enabling pulses from said pulse generator, an emitter and a collector, the emitter-collector circuit connected in series with one of the dialing circuit leads, said transistor operable to open and close the subscriber loop in response to the pulse generator pulses, and means operable to shunt the emitter-collector circuit in the voice mode and remove its base current to prevent the transistor from producing dial pulses except in the dialing mode.

6. The circuit arrangement of claim 5, wherein the last-mentioned means comprises:

fourth and fifth normally closed dial contacts connected in parallel with the emitter-collector circuit and operable to an open condition only during the dialing mode.

7. The circuit arrangement of claim 6, wherein the last-mentioned means further comprises:

a C-MOS transistor interposed between said pulse generator and said base of said transistor.

* * * * *